US012726317B2

(12) United States Patent
Deghel et al.

(10) Patent No.: US 12,726,317 B2
(45) Date of Patent: Sep. 1, 2026

(54) APPARATUS, METHODS, AND COMPUTER PROGRAMS

(71) Applicant: Nokia Technologies Oy, Espoo (FI)

(72) Inventors: Matha Deghel, Massy (FR); Sami-Jukka Hakola, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 345 days.

(21) Appl. No.: 18/579,801

(22) PCT Filed: Aug. 6, 2021

(86) PCT No.: PCT/EP2021/071996

§ 371 (c)(1),
(2) Date: Jan. 16, 2024

(87) PCT Pub. No.: WO2023/011729

PCT Pub. Date: Feb. 9, 2023

(65) Prior Publication Data

US 2024/0322974 A1 Sep. 26, 2024

(51) Int. Cl.
*H04L 5/00* (2006.01)
*H04B 7/06* (2006.01)

(52) U.S. Cl.
CPC ....... *H04L 5/0053* (2013.01); *H04B 7/06968* (2023.05)

(58) Field of Classification Search
CPC .......................... H04L 5/0053; H04B 7/06968
See application file for complete search history.

(56) References Cited

U.S. PATENT DOCUMENTS

2019/0373588 A1* 12/2019 Bae ....................... H04L 5/0091
2021/0119688 A1 4/2021 Enescu et al.
2022/0399983 A1 12/2022 Muruganathan et al.
2023/0025057 A1* 1/2023 Sun ....................... H04B 7/088
2023/0171611 A1* 6/2023 Matsumura ............ H04B 7/088 370/329
2023/0309089 A1* 9/2023 Kim ..................... H04B 7/0639
2025/0038823 A1* 1/2025 Go ........................ H04L 5/0094

FOREIGN PATENT DOCUMENTS

WO 2020/141484 A1 7/2020

OTHER PUBLICATIONS

Office action received for corresponding European Patent Application No. 21755771.9, dated Nov. 14, 2024, 5 pages.

(Continued)

*Primary Examiner* — Derrick V Rose
(74) *Attorney, Agent, or Firm* — Nokia Technologies Oy

(57) ABSTRACT

An apparatus comprises means configured to: receive information indicating that one or more of a plurality of indicators is to be changed from one of masked and unmasked to the other of masked and unmasked, wherein: the one or more indicators comprise one or more transmission configuration indicators; when an indicator of the plurality of indicators is masked, configuration associated with the respective indicator is not used; and when an indicator of the plurality of indicators is unmasked, configuration associated with the respective indicator is usable.

19 Claims, 12 Drawing Sheets

(56) References Cited

OTHER PUBLICATIONS

"3rd Generation Partnership Project; Technical Specification Group Radio Access Network; NR; Multiplexing and channel coding (Release 18)", 3GPP TS 38.212, V18.1.0, Dec. 2023, pp. 1-293.
Notice of Allowance received for corresponding European Patent Application No. 21755771.9, dated Apr. 9, 2025, 7 pages.
"3rd Generation Partnership Project; Technical Specification Group Radio Access Network; NR; Physical layer procedures for control (Release 16)", 3GPP TS 38.213, V16.6.0, Jun. 2021, pp. 1-187.
"3rd Generation Partnership Project; Technical Specification Group Radio Access Network; NR; Physical layer procedures for data (Release 16)", 3GPP TS 38.214, V16.6.0, Jun. 2021, pp. 1-172.
"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.
"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.
"New WID: Further enhancements on MIMO for NR", 3GPP TSG RAN Meeting #86, RP-193133, Agenda: 9.1.1, Samsung, Dec. 9-12, 2019, 5 pages.
"Revised WID: Further enhancements on MIMO for NR", 3GPP TSG RAN Meeting #92e, RP-211586, Agenda: 9.7.1.1, Samsung, Jun. 14-18, 2021, 6 pages.
International Search Report and Written Opinion received for corresponding Patent Cooperation Treaty Application No. PCT/EP2021/071996, dated Apr. 26, 2022, 12 pages.
"Correction of specification support for MIMO enhancements on uTCL_STxMP_DMRS_SRS_8Tx_2TA", 3GPP TSG-RAN WG1 Meeting #114bis, R1-2310761, Nokia, Oct. 9-13, 2023, 65 pages.
Office action received for corresponding Chinese Patent Application No. 202180101314.9, dated Apr. 17, 2026, 7 pages of office action and 6 pages of translation available.

* cited by examiner

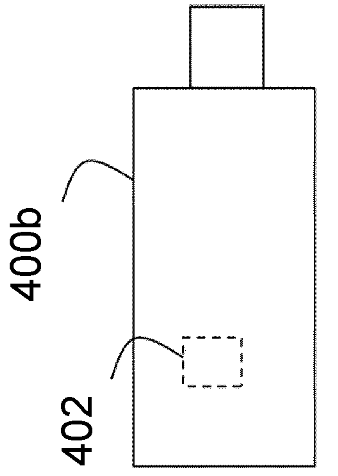
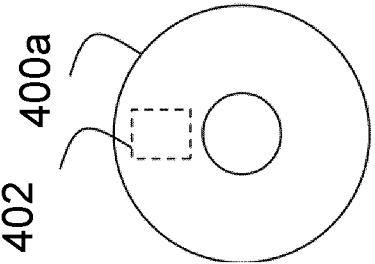
Fig. 5

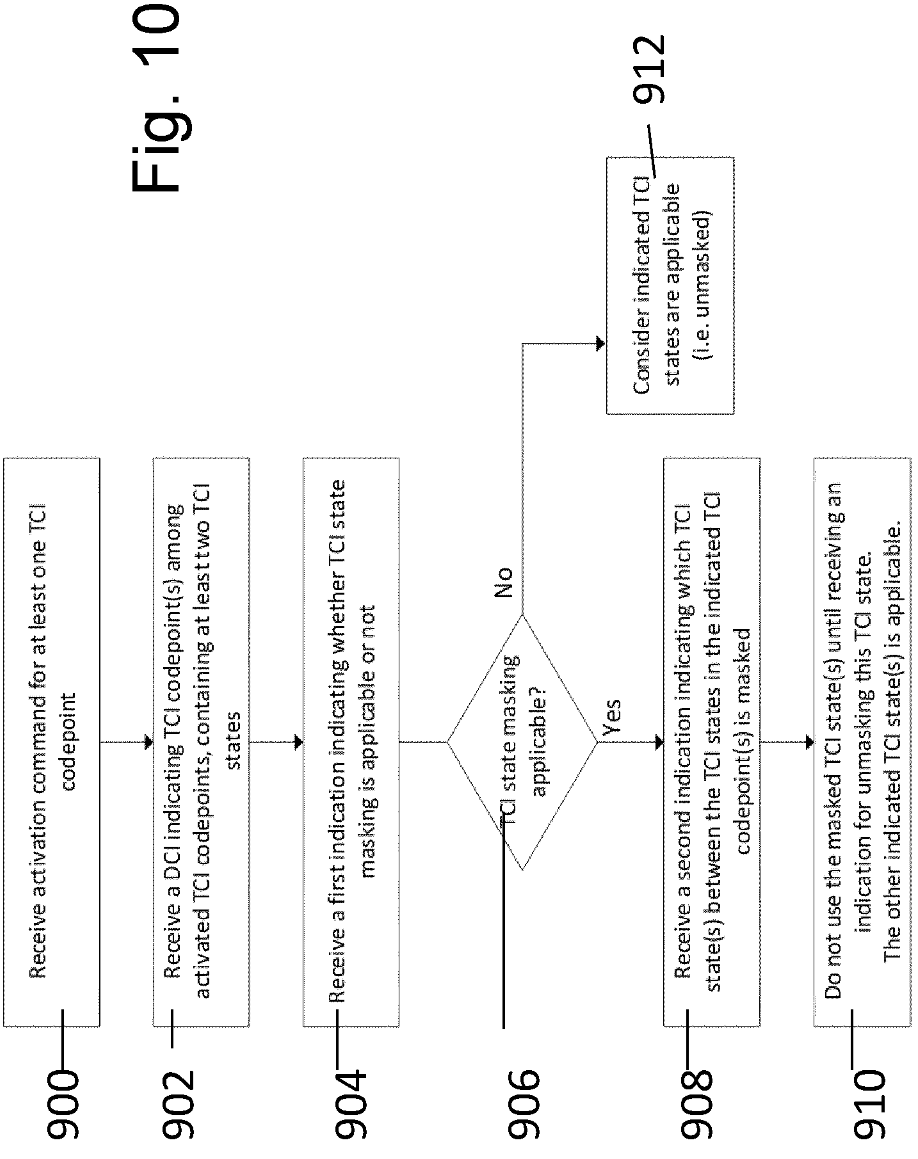
Fig. 10
900
Receive activation command for at least one TCI codepoint
902
Receive a DCI indicating TCI codepoint(s) among activated TCI codepoints, containing at least two TCI states
904
Receive a first indication indicating whether TCI state masking is applicable or not
906
TCI state masking applicable?
No
Yes
912
Consider indicated TCI states are applicable (i.e. unmasked)
908
Receive a second indication indicating which TCI state(s) between the TCI states in the indicated TCI codepoint(s) is masked
910
Do not use the masked TCI state(s) until receiving an indication for unmasking this TCI state.
The other indicated TCI state(s) is applicable.

Fig. 12

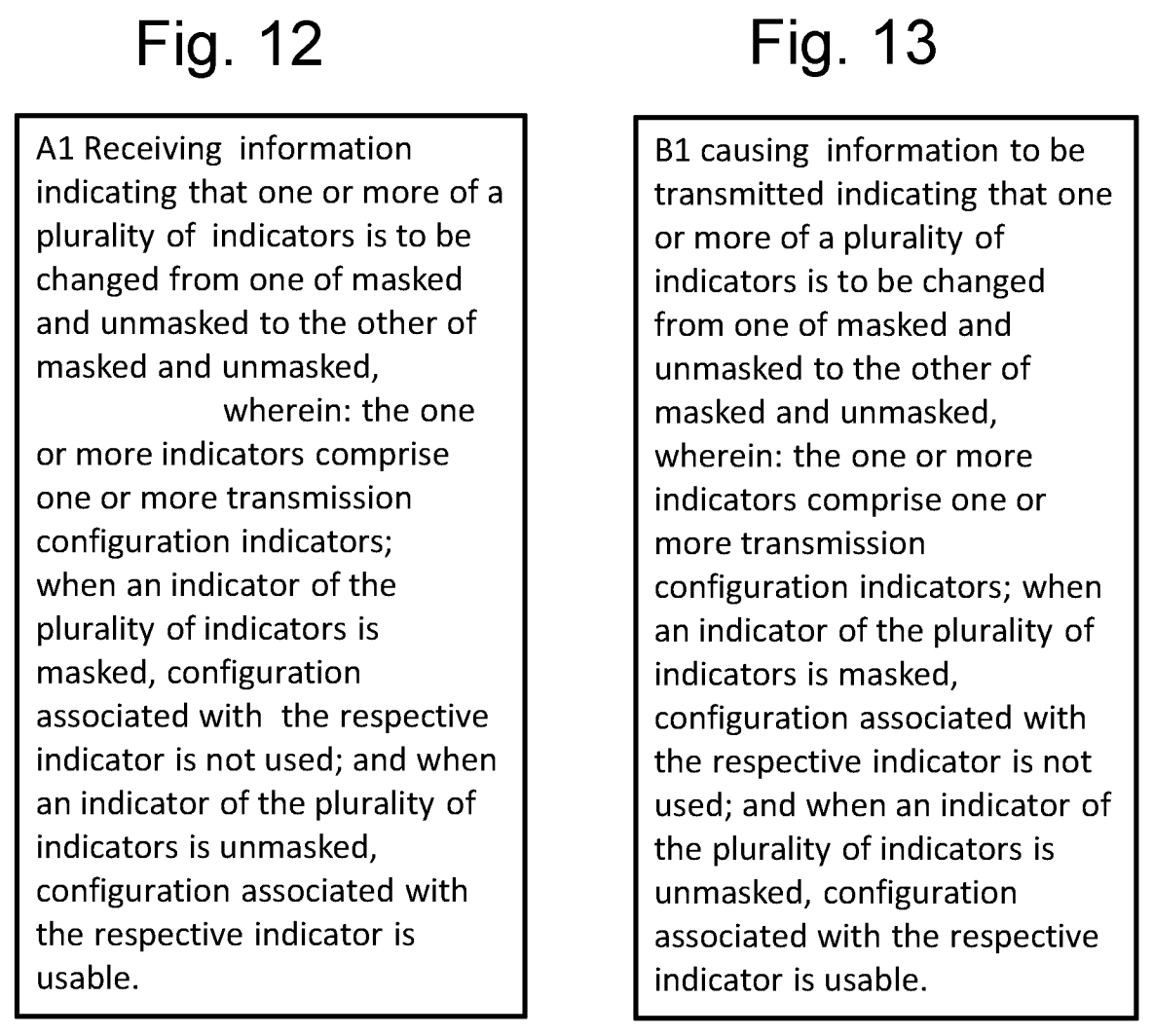

A1 Receiving information indicating that one or more of a plurality of indicators is to be changed from one of masked and unmasked to the other of masked and unmasked, wherein: the one or more indicators comprise one or more transmission configuration indicators; when an indicator of the plurality of indicators is masked, configuration associated with the respective indicator is not used; and when an indicator of the plurality of indicators is unmasked, configuration associated with the respective indicator is usable.

Fig. 13

B1 causing information to be transmitted indicating that one or more of a plurality of indicators is to be changed from one of masked and unmasked to the other of masked and unmasked, wherein: the one or more indicators comprise one or more transmission configuration indicators; when an indicator of the plurality of indicators is masked, configuration associated with the respective indicator is not used; and when an indicator of the plurality of indicators is unmasked, configuration associated with the respective indicator is usable.

APPARATUS, METHODS, AND COMPUTER PROGRAMS

RELATED APPLICATION

This application claims priority to PCT Application No. PCT/EP2021/071996 filed Aug. 6, 2021, which is incorporated herein by reference in its entirety.

FIELD

The present disclosure relates to apparatus, methods, and computer programs, and in particular but not exclusively to apparatus, methods, and computer programs for changing a transmission configuration indicator.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined.

Examples of standards are the so-called 5G standards. Another example of a communications system is UTRAN (3G radio). Another example of an architecture that is known is the long-term evolution (LTE) or the Universal Mobile Telecommunications System (UMTS) radio-access technology.

SUMMARY

According to an aspect, there is provided an apparatus comprising means configured to: receive information indicating that one or more of a plurality of indicators is to be changed from one of masked and unmasked to the other of masked and unmasked, wherein: the one or more indicators comprise one or more transmission configuration indicators; when an indicator of the plurality of indicators is masked, configuration associated with the respective indicator is not used; and when an indicator of the plurality of indicators is unmasked, configuration associated with the respective indicator is usable.

A respective transmission configuration indicator may be provided by one or more of a transmission configuration indicator state and quasi co location information.

The information indicating that one or more of the plurality of indicators is to be changed from one of masked and unmasked to the other of masked and unmasked may be provided by one or more of downlink control information, a medium access control element, radio resource control signalling and a bitmap.

The means may be configured to receive information indicating if masking is applicable to one or more of the indicators.

The information indicating if masking is applicable to one or more of the indicators may be provided by one or more of downlink control information, a medium access control control element, radio resource control signalling and a bitmap.

When an indicator of the plurality of indicators is masked, the respective indicator may be kept masked until the respective indicator is unmasked.

The means may be configured to apply masking, when a respective indicator of the plurality of indicators is masked, only on a first transmission instance or on a configured number of transmission instances related to the masking.

The means may be configured to apply the masking to at least one of: one or more channels; one or more reference signals; and one of uplink or downlink; one or more control resource sets; and one or more component carriers.

The plurality of transmission configuration indicator states may be contained in or associated with one or more transmission configuration indicator codepoints.

The means may be configured to receive information indicating activation of one or more of the transmission configuration indicator states contained in or associated with one or more transmission configuration indicator codepoints.

The means may be configured to receive information about the plurality of indicators via downlink control information.

The means may be configured to use one or more of the indicators, when unmasked, for a repeated transmission of an uplink channel.

The plurality of indicators may comprise two uplink indicators, and in one mode one of said uplink indicators is masked and one of said uplink indicators is unmasked.

The plurality of indicators may comprise two uplink indicators and when unmasked the means is configured to receive information indicating which of the two uplink indicators is to be applied first.

The apparatus may be provided in a communications device or may be a communications device.

According to another aspect, there is provided an apparatus, the apparatus comprising at least one processor and at least one memory including a computer program code, the at least one memory and computer program code configured to, with the at least one processor, cause the apparatus at least to: receive information indicating that one or more of a plurality of indicators is to be changed from one of masked and unmasked to the other of masked and unmasked, wherein: the one or more indicators comprise one or more transmission configuration indicators; when an indicator of the plurality of indicators is masked, configuration associated with the respective indicator is not used; and when an indicator of the plurality of indicators is unmasked, configuration associated with the respective indicator is usable.

A respective transmission configuration indicator may be provided by one or more of a transmission configuration indicator state and quasi co location information.

The information indicating that one or more of the plurality of indicators is to be changed from one of masked and unmasked to the other of masked and unmasked may be provided by one or more of downlink control information, a medium access control element, radio resource control signalling and a bitmap.

The at least one memory and at least one processor may be configured to cause the apparatus to receive information indicating if masking is applicable to one or more of the indicators.

The information indicating if masking is applicable to one or more of the indicators may be provided by one or more of downlink control information, a medium access control control element, radio resource control signalling and a bitmap.

When an indicator of the plurality of indicators is masked, the respective indicator may be kept masked until the respective indicator is unmasked.

The at least one memory and at least one processor may be configured to cause the apparatus to apply masking, when a respective indicator of the plurality of indicators is masked, only on a first transmission instance or on a configured number of transmission instances related to the masking.

The at least one memory and at least one processor may be configured to cause the apparatus to apply the masking to at least one of: one or more channels; one or more reference signals; and one of uplink or downlink; one or more control resource sets; and one or more component carriers.

The plurality of transmission configuration indicator states may be contained in or associated with one or more transmission configuration indicator codepoints.

The at least one memory and at least one processor may be configured to cause the apparatus to receive information indicating activation of one or more of the transmission configuration indicator states contained in or associated with one or more transmission configuration indicator codepoints.

The at least one memory and at least one processor may be configured to cause the apparatus to receive information about the plurality of indicators via downlink control information.

The at least one memory and at least one processor may be configured to cause the apparatus to use one or more of the indicators, when unmasked, for a repeated transmission of an uplink channel.

The plurality of indicators may comprise two uplink indicators, and in one mode one of said uplink indicators is masked and one of said uplink indicators is unmasked.

The plurality of indicators may comprise two uplink indicators and when unmasked the at least one memory and at least one processor may be configured to cause the apparatus to receive information indicating which of the two uplink indicators is to be applied first.

The apparatus may be provided in a communications device or may be a communications device.

According to another aspect, there is provided a method comprising: receiving information indicating that one or more of a plurality of indicators is to be changed from one of masked and unmasked to the other of masked and unmasked, wherein: the one or more indicators comprise one or more transmission configuration indicators; when an indicator of the plurality of indicators is masked, configuration associated with the respective indicator is not used; and when an indicator of the plurality of indicators is unmasked, configuration associated with the respective indicator is usable.

A respective transmission configuration indicator may be provided by one or more of a transmission configuration indicator state and quasi co location information.

The information indicating that one or more of the plurality of indicators is to be changed from one of masked and unmasked to the other of masked and unmasked may be provided by one or more of downlink control information, a medium access control element, radio resource control signalling and a bitmap.

The method may comprise receiving information indicating if masking is applicable to one or more of the indicators.

The information indicating if masking is applicable to one or more of the indicators may be provided by one or more of downlink control information, a medium access control control element, radio resource control signalling and a bitmap.

When an indicator of the plurality of indicators is masked, the respective indicator may be kept masked until the respective indicator is unmasked.

The method may comprise applying masking, when a respective indicator of the plurality of indicators is masked, only on a first transmission instance or on a configured number of transmission instances related to the masking.

The method may comprise applying the masking to at least one of: one or more channels; one or more reference signals; and one of uplink or downlink; one or more control resource sets; and one or more component carriers.

The plurality of transmission configuration indicator states may be contained in or associated with one or more transmission configuration indicator codepoints.

The method may comprise receiving information indicating activation of one or more of the transmission configuration indicator states contained in or associated with one or more transmission configuration indicator codepoints.

The method may comprise receiving information about the plurality of indicators via downlink control information.

The method may comprise using one or more of the indicators, when unmasked, for a repeated transmission of an uplink channel.

The plurality of indicators may comprise two uplink indicators, and in one mode one of said uplink indicators is masked and one of said uplink indicators is unmasked.

The plurality of indicators may comprise two uplink indicators and when unmasked the method may comprise receiving information indicating which of the two uplink indicators is to be applied first.

The method may be performed by an apparatus. The apparatus may be provided in a communications device or may be a communications device.

According to another aspect, there is provided an apparatus comprising means configured to: cause information to be transmitted indicating that one or more of a plurality of indicators is to be changed from one of masked and unmasked to the other of masked and unmasked, wherein: the one or more indicators comprise one or more transmission configuration indicators; when an indicator of the plurality of indicators is masked, configuration associated with the respective indicator is not used; and when an indicator of the plurality of indicators is unmasked, configuration associated with the respective indicator is usable.

A respective transmission configuration indicator may be provided by one or more of a transmission configuration indicator state and quasi co location information.

The information indicating that one or more of the plurality of indicators is to be changed from one of masked and unmasked to the other of masked and unmasked may be provided by one or more of downlink control information, a medium access control element, radio resource control signalling and a bitmap.

The means may be configured to cause information to be transmitted indicating if masking is applicable to one or more of the indicators.

The information indicating if masking is applicable to one or more of the indicators may be provided by one or more of downlink control information, a medium access control control element, radio resource control signalling and a bitmap.

The plurality of transmission configuration indicator states may be contained in or associated with one or more transmission configuration indicator codepoints.

The means may be configured to cause information to be transmitted indicating activation of one or more of the transmission configuration indicator states contained in or associated with one or more transmission configuration indicator codepoints.

The means may be configured to cause information about the plurality of indicators to be provided via downlink control information.

The plurality of indicators may comprise two uplink indicators.

The plurality of indicators may comprise two uplink indicators and when unmasked, the means is configured to cause information to be transmitted indicating which of the two uplink indicators is to be applied first.

The apparatus may be provided in a base station or other access point or may be a base station or other access point.

According to another aspect, there is provided an apparatus, the apparatus comprising at least one processor and at least one memory including a computer program code, the at least one memory and computer program code configured to, with the at least one processor, cause the apparatus at least to: cause information to be transmitted indicating that one or more of a plurality of indicators is to be changed from one of masked and unmasked to the other of masked and unmasked, wherein: the one or more indicators comprise one or more transmission configuration indicators; when an indicator of the plurality of indicators is masked, configuration associated with the respective indicator is not used, and when an indicator of the plurality of indicators is unmasked, configuration associated with the respective indicator is usable.

A respective transmission configuration indicator may be provided by one or more of a transmission configuration indicator state and quasi co location information.

The information indicating that one or more of the plurality of indicators is to be changed from one of masked and unmasked to the other of masked and unmasked may be provided by one or more of downlink control information, a medium access control element, radio resource control signalling and a bitmap.

The at least one memory and at least one processor may be configured to cause the apparatus to cause information to be transmitted indicating if masking is applicable to one or more of the indicators.

The information indicating if masking is applicable to one or more of the indicators may be provided by one or more of downlink control information, a medium access control control element, radio resource control signalling and a bitmap.

The plurality of transmission configuration indicator states may be contained in or associated with one or more transmission configuration indicator codepoints.

The at least one memory and at least one processor may be configured to cause the apparatus to cause information to be transmitted indicating activation of one or more of the transmission configuration indicator states contained in or associated with one or more transmission configuration indicator codepoints.

The at least one memory and at least one processor may be configured to cause the apparatus to cause information about the plurality of indicators to be provided via downlink control information.

The plurality of indicators may comprise two uplink indicators.

The plurality of indicators may comprise two uplink indicators and when unmasked, the at least one memory and at least one processor may be configured to cause information to be transmitted indicating which of the two uplink indicators is to be applied first.

The apparatus may be provided in a base station or other access point or may be a base station or other access point.

According to another aspect, there is provided a method comprising: causing information to be transmitted indicating that one or more of a plurality of indicators is to be changed from one of masked and unmasked to the other of masked and unmasked, wherein: the one or more indicators comprise one or more transmission configuration indicators; when an indicator of the plurality of indicators is masked, configuration associated with the respective indicator is not used; and when an indicator of the plurality of indicators is unmasked, configuration associated with the respective indicator is usable.

A respective transmission configuration indicator may be provided by one or more of a transmission configuration indicator state and quasi co location information.

The information indicating that one or more of the plurality of indicators is to be changed from one of masked and unmasked to the other of masked and unmasked may be provided by one or more of downlink control information, a medium access control element, radio resource control signalling and a bitmap.

The method may comprise causing information to be transmitted indicating if masking is applicable to one or more of the indicators.

The information indicating if masking is applicable to one or more of the indicators may be provided by one or more of downlink control information, a medium access control control element, radio resource control signalling and a bitmap.

The plurality of transmission configuration indicator states may be contained in or associated with one or more transmission configuration indicator codepoints.

The method may comprise causing information to be transmitted indicating activation of one or more of the transmission configuration indicator states contained in or associated with one or more transmission configuration indicator codepoints.

The method may comprise causing information about the plurality of indicators to be provided via downlink control information.

The plurality of indicators may comprise two uplink indicators.

The plurality of indicators may comprise two uplink indicators and when unmasked, the method comprises causing information to be transmitted indicating which of the two uplink indicators is to be applied first.

The method may be performed by an apparatus. The apparatus may be provided in a base station or other access point or may be a base station or other access point.

According to another aspect, there is provided a computer readable medium comprising program instructions for causing an apparatus to perform at least the method according to any of the preceding aspects.

According to another aspect, there is provided a non-transitory computer readable medium comprising program instructions for causing an apparatus to perform at least the method according to any of the preceding aspects.

According to another aspect, there is provided a computer program comprising program instructions for causing a computer to perform any method as described above.

According to another aspect, there is provided a computer program product stored on a medium may cause an apparatus to perform any method as described herein.

According to another aspect, there is provided an electronic device that may comprise apparatus as described herein.

According to another aspect, there is provided a chipset that may comprise an apparatus as described herein.

In the above, many different embodiments have been described. It should be appreciated that further embodiments may be provided by the combination of any two or more of the embodiments described above.

BRIEF DESCRIPTION OF FIGURES

Embodiments will now be described, by way of example only, with reference to the accompanying Figures in which:

FIG. 5 shows a schematic representation of a non-volatile memory medium storing instructions which when executed by a processor allow a processor to perform one or more of the steps of the methods of some examples;

FIG. 10 shows a method of some embodiments;

FIGS. 12 and 13 are flow charts showing example operations of described apparatuses.

DETAILED DESCRIPTION

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
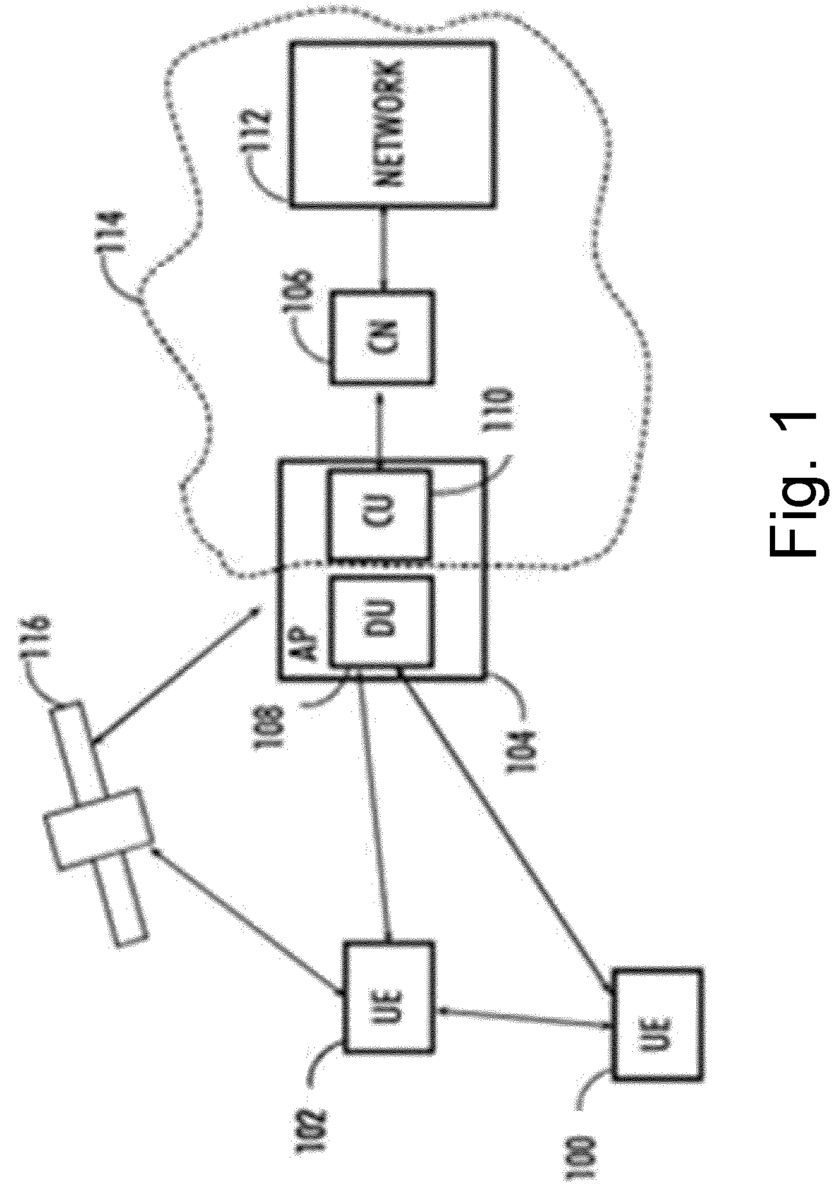
FIG. 1 shows an example system architecture.

FIG. 1 depicts examples of simplified system architectures only showing some elements and functional entities, all being logical units, whose implementation may differ from what is shown. The connections shown in FIG. 1 are logical connections, the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server, or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW and P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, a wireless interface card or other wireless interface facility (e.g., USB dongle) and multimedia device. It should be appreciated that a device may also be a nearly exclusive uplink only device, of which an example is a camera or video camera loading images or video clips to a network. The device may be a machine-type communications (MTC) device, an Internet of things (IoT) type communication device. The device may be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones, or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors, and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave).

One of the concepts considered to be used in 5G networks is network slicing in which multiple independent and dedicated virtual sub-networks (network instances) may be created within the same infrastructure to run services that have different requirements on latency, reliability, throughput, and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets, and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes, or hosts. Application of cloud RAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or NodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have access to a plurality of radio cells and the system may comprise also other apparatuses, such as physical layer relay nodes or other network elements, etc. At least one of the (e/g)NodeBs or may be a Home (e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)gNodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
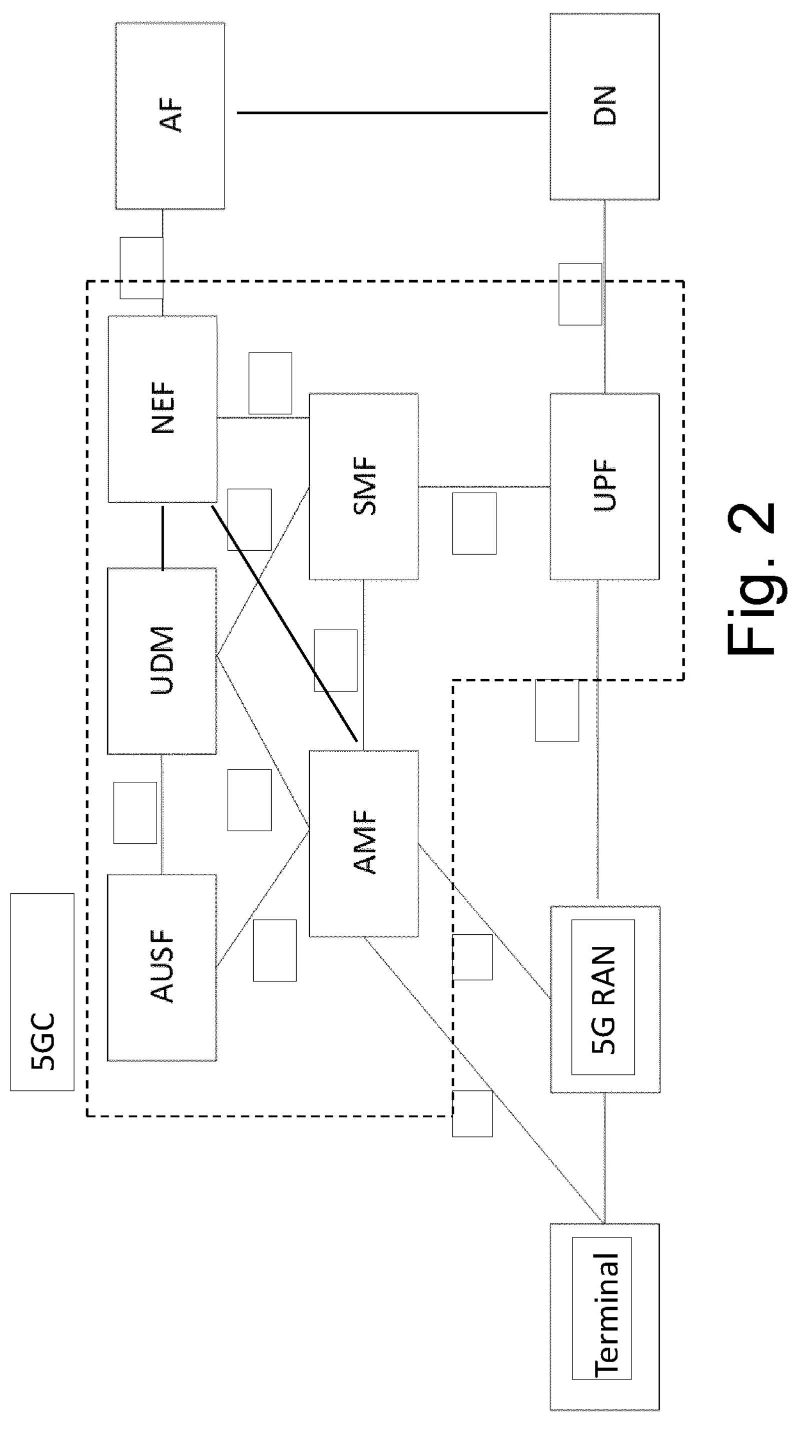
FIG. 2 shows a schematic diagram of an example 5G system.

FIG. 2 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application functions (AF) and one or more data networks (DN).

The 5G-RAN may comprise one or more base stations. In 5G the base station may be referred to as a gNodeB (gNB). The RAN may comprise one or more gNodeB (gNB) (or base station) distributed unit functions connected to one or more gNodeB (gNB) (or base station) centralized unit functions.

The 5GC may comprise the following entities: one or more access management functions (AMF), one or more session management functions (SMF), an authentication server function (AUSF), a unified data management (UDM), one or more user plane functions (UPF), and/or a network exposure function (NEF).

Figure 3:
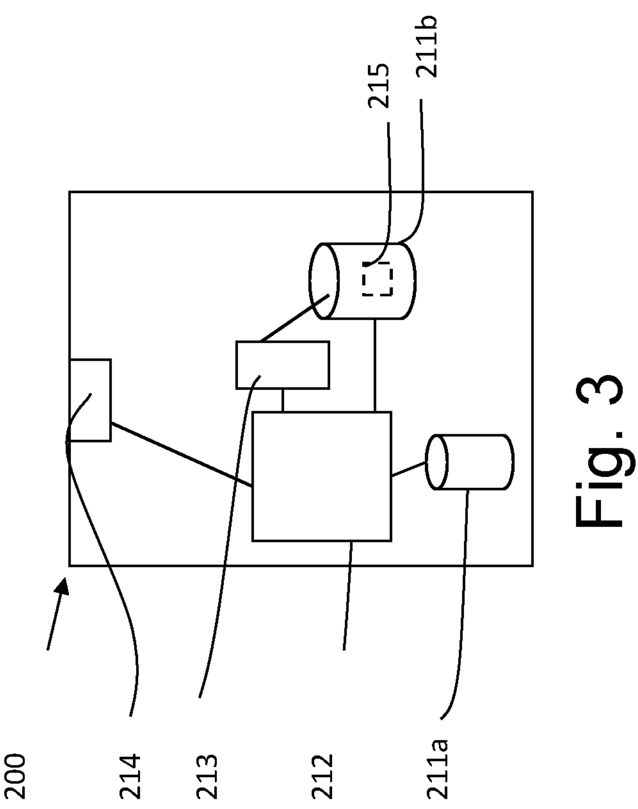
FIG. 3 shows a schematic diagram of an example communication device.

FIG. 3 illustrates an example of an apparatus 200. The apparatus may be provided for example in a communication device or an access point. The apparatus may comprise at least one memory. By way of example only the at least one memory may comprise random access memory (RAM) 211*a* and at least on read only memory (ROM) 211*b*. Apparatus used by other embodiments may comprise different memory.

The apparatus may comprise at least one processor 212, 213. In this example apparatus, two processors are shown.

The apparatus may comprise an input/output interface 214.

The at least one processor may be coupled to the at least one memory. The at least one processor may be configured to execute an appropriate software code 215. The software code 215 may for example allow the method of some embodiments to be performed.

The software code 215 may be stored in the at least one memory, for example ROM 211*b*.

Figure 4:
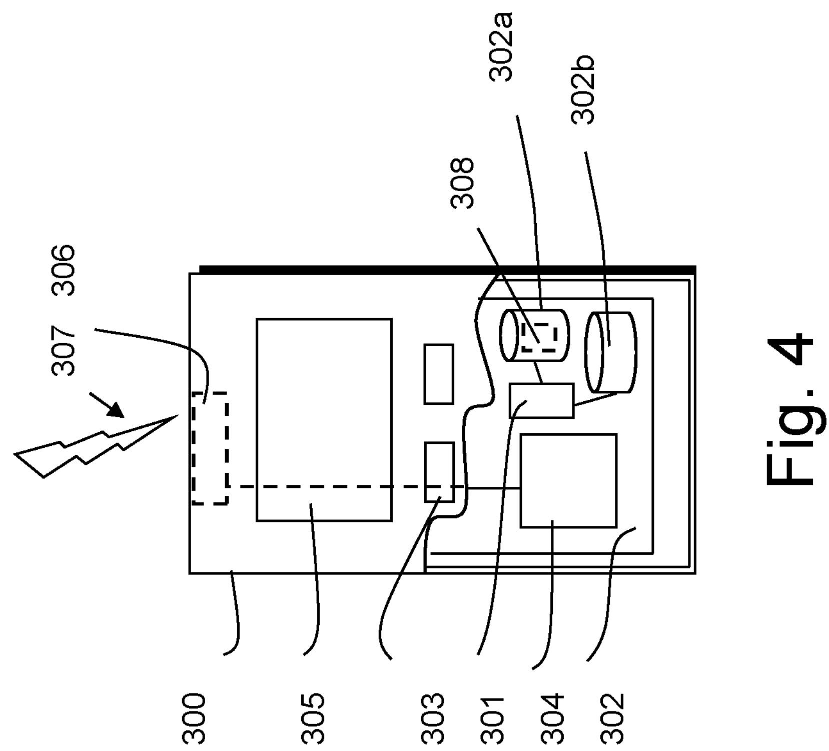
FIG. 4 shows a schematic diagram of an example apparatus.

FIG. 4 illustrates an example of a device 300, such as the devices 100 and 102 illustrated in FIG. 1.

The terminal 300 may receive signals over an air or radio interface 307 via appropriate apparatus for receiving and may transmit signals via appropriate apparatus for transmitting radio signals. In FIG. 4 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 311*a* and the ROM 311*b*. The at least one processor 301 may be configured to execute an appropriate software code 308. The software code 308 may for example allow to perform one or more of the present aspects. The software code 308 may be stored in the ROM 311*b*.

The processor, storage and other relevant control apparatus can be provided on an appropriate circuit board and/or in chipsets. This feature is denoted by reference 304.

The device may optionally have a user interface such as keypad 305, touch sensitive screen or pad, combinations thereof or the like.

Optionally one or more of a display, a speaker and a microphone may be provided depending on the type of the device.

In the following examples, the communications device is referred to as a UE. However, it should be appreciated that the communication device can any suitable communications device, some examples of which have already been mentioned.

Some embodiments may relate to MIMO. In the following examples, reference is made to NR MIMO. However, it should be appreciated that this is by way of example and other embodiments may be applied in different standards.

Some embodiments relate to multi-beam operation. This may be on the so-called FR2 (frequency range 2) frequencies (24250-52600 MHz) and/or the so-called FR1 (frequency range 1) frequencies (410-7125 MHz) or any other suitable frequencies.

Some embodiments may aim to facilitate a more efficient (for example a lower latency and/or overhead) DL/UL (uplink/downlink) beam management. This may be for intra-cell and/or inter-cell scenarios. This may be to support a higher UE speed and/or a larger number of configured TCI (transmission configuration indicator) states.

The transmission configuration indicator (TCI) state may be used to signal which channels/antenna ports are QCL (quasi co location) and thus have similar transmit and/or receive processing performed on them. A TCI state may therefore be said to indicate a spatial relationship between at least two channels and/or between at least two ports. For example, QCL-relationships between downlink reference signals in one channel state information (CSI)-reference signal set and the physical downlink shared channel (PDSCH) demodulation reference (DMRS) signal ports may be indicated using a TCI state.

Under the concept of QCL (quasi-colocation), a UE receiver can e.g. assume that the radio channels corresponding to two different antenna ports have the same large-scale properties in terms of specific parameters if and only if the antenna ports are specified as being quasi-colocated. These specific parameters may be one or more of average delay spread, Doppler spread/shift, average delay, spatial Rx parameters and/or any other suitable parameters.

A UE may be configured with a list of up to "M" TCI-State configurations by the network, where M depends on the UE capability.

The TCI state may thus be considered to be a container that comprises QCL source reference signal(s) from which a UE extracts and/or extrapolates spatial source characteristics to assist the UE in setting its receive beam properly for the downlink reception (or its transmit beam properly for the uplink transmission). Similarly, a generic signalled spatial relation carries a reference signal that may be used as a spatial source to indicate to a UE how to set its transmit beam for the uplink transmission.

Some embodiments may aim to have common beam for data and control transmission/reception for DL and UL, for example for intra-band CA (carrier aggregation).

Some embodiments may aim to have a unified TCI framework for DL and UL beam indication.

Some embodiments may aim to make more use of dynamic control signalling. (This is in contrast to RRC (radio resource control) signalling). This may be to improve latency and efficiency.

Some embodiments may aim to facilitate UL beam selection for UEs equipped with multiple antenna panels, taking into account UL coverage loss mitigation due to MPE (Maximum Permissible Exposure), based on UL beam indication with the unified TCI framework for UL fast panel selection.

In some embodiments, for inter-cell beam management, a UE may transmit to or receive from only a single cell (i.e. the serving cell does not change when beam selection is done). This may include L1 (layer 1)-only measurement/reporting (i.e. no L3 (layer 3) impact) and/or a beam indication associated with cell(s) with any physical cell ID(s). The beam indication is based on a unified TCI framework. The same beam measurement/reporting mechanism may be used for inter-cell mTRP (multi transmission reception point.

The unified TCI framework may provide a common TCI state (also referred to an indicated TCI) for a set of signals and channels at a time. The TCI state may be for both UL and DL or separate TCI states may be provided for UL and DL.

The RRC configures a set (or pool) of joint and/or separate TCI states. The MAC (medium access control) activates a number (e.g. 8) of joint and/or separate TCI states. The activated TCI states are associated with at least one TCI codepoint. Before the first TCI state indication, the first activated TCI state is considered as the current indicated TCI state. DCI (downlink control information) indicates one of the activated TCI states to be the indicated TCI state (which may be a joint/common TCI state).

The DCI format 1_1/1_2 with and without DL assignment may be used in some embodiments to carry the TCI state indication. The TCI state indication may be confirmed by HARQ ACK (hybrid automatic repeat request acknowledgment) by the UE.

The application time of the beam indication may be the first slot that is at least X ms or Y symbols after the last symbol of the acknowledgment of the joint or separate DL/UL beam indication.

Some embodiments may aim to reduce latency for MAC CE (control element) based TCI state activation.

Some embodiments may relate to cases where more than one TCI state would be indicated at a time. This may be used where more than one UL TCI state at a time is provided for multi-TRP or multi-UL-beam operation. An uplink channel (such as PUCCH (physical uplink control channel) and/or PUSCH (physical uplink shared channel)) is repeated/transmitted towards two different TRPs or (more generally) on two different beams. The repeated uplink channels use two different UL TCI states each of which corresponding to a TRP. This may be used to increase reliability and/or robustness for the uplink channel.

However, it is possible that the link corresponding to one TRP is sometimes in 'bad' conditions. This may for example be due to a blockage or a MPE situation. In this case, it may be desirable for the PUCCH/PUSCH repetitions to be transmitted towards only the TRP for which the link is not suffering from blockage or MPE issues. A given UE may have different services associated with different requirements. Depending on which service the traffic is associated with at a given time, the network may prefer to operate with, for example, two TRPs/UL TCI states or only a single TRP/TCI state for an UL channel repetition operation.

DL DCI formats (1_1 and 1_2) may be used for the indication of e.g. two UL TCI states. Specifically, a TCI codepoint indicated in the DCI would point to two UL TCI states (where at least one of these TCI states may be a joint/common TCI state (i.e. also used for DL)). A multi-TRP PUSCH/PUCCH repetition operation triggered by a DCI (e.g. dynamically scheduled PUSCH) or simply configured (e.g. configured grant PUSCH) would then use these two UL TCI states. However, as discussed previously, at some instances it may be preferable to switch from the multi-UL-TCI states mode to a single-UL-TCI state. And, in some scenarios, one of the already indicated UL TCI states may still be preferable or still good to be used.

In order to switch from multi-UL-TCI states mode, e.g. UL-TCI-stateG and UL-TCI-state1, to a single-UL-TCI state mode, e.g. UL-TCI-state0, if the current defined operation is extended, the network would need to proceed as follows: first have a TCI codepoint, already activated by MAC CE (or more precisely, the associated TCI states are activated by MAC CE), which points to a single UL TCI state (i.e. UL-TCI-state0); then send a DL DCI format to indicate this TCI codepoint (which points to UL-TCI-state0). However, this may reduce the flexibility regarding which TCI codepoints, or more precisely which TCI states (which are associated to a TCI codepoint(s)), could be activated at a time and may result in increasing the DL control overhead.

In the following some embodiments are described. One or more of these embodiments may enable a faster and/or more flexible TCI state selection. This may be when going from a multi-TCI-state mode (with two or more states) to a single-TCI-state mode (or lower number of states). This may be without increasing the control overhead and/or without impacting the flexibility in terms of TCI codepoints activation.

In some embodiments, a TCI codepoint may contain more than one TCI state (such as one DL TCI state and one UL TCI state, two UL TCI states, two DL TCI states, or one joint/common TCI state and one UL TCI state, etc.). It is assumed that this TCI codepoint has been activated (via MAC CE), i.e. the corresponding TCI states are activated and associated with this TCI codepoint (via MAC CE), and indicated for the UE via a (DL) DCI. An alternative would be that two TCI codepoints may be indicated e.g. in the same (or even different) (DL) DCI where each TCI codepoint may contain an UL TCI state (which may be joint/common TCI state).

A UE may be indicated, using a first indication, whether to apply masking of at least one TCI state contained in the indicated TCI codepoint(s).

If a TCI state is masked, then this TCI state may be (temporarily) deactivated (from the PHY layer perspective) and thus cannot be used until it is unmasked.

Alternatively, if a TCI state is masked, then the UE may apply this masking only on the first transmission instance (e.g. PUSCH or PUCCH transmission instance) that is impacted by this masking.

Alternatively, if a TCI state is masked, then the UE may apply this masking only on a configured or indicated number of first transmission instances that are impacted by this masking.

If the above first indication indicates that masking applies, a second indication may be used to indicate to the UE which TCI state(s) is masked (or equivalently, which TCI state(s) is not masked or unmasked).

For instance, in a case where the TCI codepoint(s) contains two UL TCI states (where at least one of these TCI states may be a joint/common TCI state), the first indication indicates whether the two UL TCI states should be kept in use (i.e. 'no masking' or 'unmasking') or whether a masking of one of these TCI states should be applied.

In the case of masking, the second indication may then indicate which UL TCI state to mask. Hence, this allows the network to dynamically instruct the UE whether to apply single-UL-TCI mode or multi-UL-TCI mode (e.g. two UL TCI states here).

In another example, in the case the TCI codepoint(s) contain one DL TCI state and one UL TCI state (where at least one of these TCI states may be a joint/common TCI state), the first indication indicates whether these two TCI states should be kept in use (i.e. 'no masking' or 'unmasking') or whether a masking of one of these TCI states should be applied. In case of masking, the second indication may then indicate which TCI state to mask, i.e. the DL TCI state or the UL TCI state. Hence, this allows the network to dynamically 'put on hold' one of the indicated DL TCI state or UL TCI state.

In this case, when one of the UL or DL TCI states is masked, the UE may be configured to use a default TCI state instead of the masked one. The default TCI state may be the (first) UL or DL TCI state contained in the TCI codepoint with lowest index. Alternatively, a default TCI state may even be the indicated TCI state that is not masked.

TCI state masking may be configured/indicated (e.g. via RRC, or a dedicated or reserved field in MAC CE) to only apply for a certain (physical) channel(s)/RS(s) (reference signal(s); such as CSI-RS, Demodulation RS, Sounding RS) or only for UL or only for DL.

For example, if the masked UL TCI state is also a joint/common TCI state (i.e. it also applies to DL), then the masking may be configured to be applicable only for UL, i.e. if this TCI state is masked it would be still used for DL (but not for UL).

As another example, TCI state masking may be configured as part of the PUCCH configuration, PUSCH configuration, configured grant PUSCH configuration(s), PDCCH (physical downlink control channel), PDSCH (physical downlink shared channel) configuration, SRS (sounding reference signal) configuration, any other RS configuration, etc. Alternatively, masking may be configured to apply to all UL and/or DL channel(s)/RS(s).

In an alternative, TCI state masking may be configured per (activated) TCI codepoint (or a set of (configured) TCI codepoints); or per active TCI state (or a set of active TCI states). Specifically, for a given TCI codepoint (associated with active TCI state(s)), the UE is configured or indicated (e.g. via a MAC CE field associated with this TCI codepoint (associated to active TCI state(s)) which TCI state(s) or at least which (physical) channel(s)/RS(s) the masking (when indicated) may apply to.

In another embodiment, the TCI state masking may be configured per CC (component carrier) or a subset/group of CCs. TCI state masking for at least one CC (e.g. CC with no TCI state pool) may follow the masking on a reference CC.

The first indication, indicating if masking applies, may be carried via DCI/PDCCH, via a MAC CE, and/or via RRC or any other suitable way. This may be as described below. Where the first indication is carried via DCI/PDCCH, a dedicated (e.g. 1-bit) field may be provided in the DCI format to carry the indication. Alternatively, an existing/reserved field may be leveraged/used to carry this indication. In other embodiments, other variants such as listed below which carry the indication may be used:

- e.g. DCI format(s) dependent, i.e. it is configured (e.g. via RRC) per DCI format whether masking should be applied or not if a certain DCI format is used—thus DCI format serves as an indication on whether masking applies or not;
- CORESET(s) (control resource set) (or even CORESET-PoolIndex in case of multi-DCI operation mode) dependent, i.e. it is configured (e.g. via RRC) per CORESET or group of CORESETs (in at least one component carrier) whether masking should be applied or not if a certain CORESET is used—the CORESET on which the PDCCH carrying the DCI is transmitted (implicitly) indicates whether masking should be applied or not;
- RNTI(s) (radio network temporary identifier) dependent, i.e. different RNTIs used for scrambling the DCI can be used to carry the indication whether masking should be applied or not; and
- HARQ process dependent, i.e. some HARQ process IDs are used to infer whether masking should be applied or not. Thus the UE knows whether masking should be applied based on the indicated/used HARQ process ID.

The first indication may be, for example, carried via a MAC CE—a MAC CE (e.g. 1-bit) field may be used to carry the indication. Alternatively, an existing MAC CE reserved bit(s)/fields may be used to carry the indication.

The second indication, which indicates which TCI states are to be masked/unmasked, may also be carried via DCI, MAC CE and/or RRC.

In case RRC is used, the UE is configured via RRC which TCI states to mask: e.g. the first or second (UL) TCI state contained in the indicated codepoint(s); the TCI state corresponding to higher/lower index; the TCI state corresponding to UL/DL; and/or any other suitable indication.

The options described (above) in relation to the first indication for DCI based indication and MAC CE based indication may alternatively or additionally be used for the second indication; e.g. explicit DCI/MAC CE field (dedicated or reserved/existing field) approach, DCI format based approach, CORESET based approach, RNTI based approach, or HARQ process ID approach, could be used to indicate in case of masking which TCI state(s) is masked.

In some embodiments, the second indication may consist of a bitmap indicating whether at least one TCI state is masked or not.

In some embodiments one unified indication may be used to indicate whether masking applies and, in case of masking, which TCI state(s) is masked (or equivalently, which TCI state(s) is not masked or unmasked).

In some embodiments, a MAC CE may be used to mask/unmask at least one (active) TCI state of a TCI codepoint e.g. using a MAC CE field associated to TCI codepoint field. For example, the TCI states in a TCI codepoint may be indexed (e.g. starting from index 1), and the MAC CE field indicates the index of TCI state to mask, and index 0 may indicate that no TCI state is masked; an index here may point to one or more than one TCI state.

Alternatively, the masking/unmasking could be done using a bitmap indicated via MAC CE field. Specifically, e.g., if a TCI codepoint contains two/three TCI states, a 2-bit/3-bit bitmap may be used to indicate whether each TCI state is masked or not (e.g. bit '0' indicates that the corresponding TCI state is masked and bit '1' indicates that this TCI state is unmasked or vice versa).

When there is e.g. two TCI codepoints indicated, DCI may be used to mask/unmask one of the indicated TCI codepoints and thus the corresponding TCI state(s). Note that the bitmap approach for indication explained above may also be applied for the indication via DCI, where here the first bit would indicate whether the first TCI codepoint is masked or not, and the second bit would indicate whether the second TCI codepoint is masked or not.

In some embodiment(s), the masking/unmasking may be done at both the MAC level and PHY level.

Note that in case DCI-based approach is used to carry both the first and second indications, these indications may be carried via same DCI or different DCIs (i.e. carried by two different PDCCHs).

Figure 6:
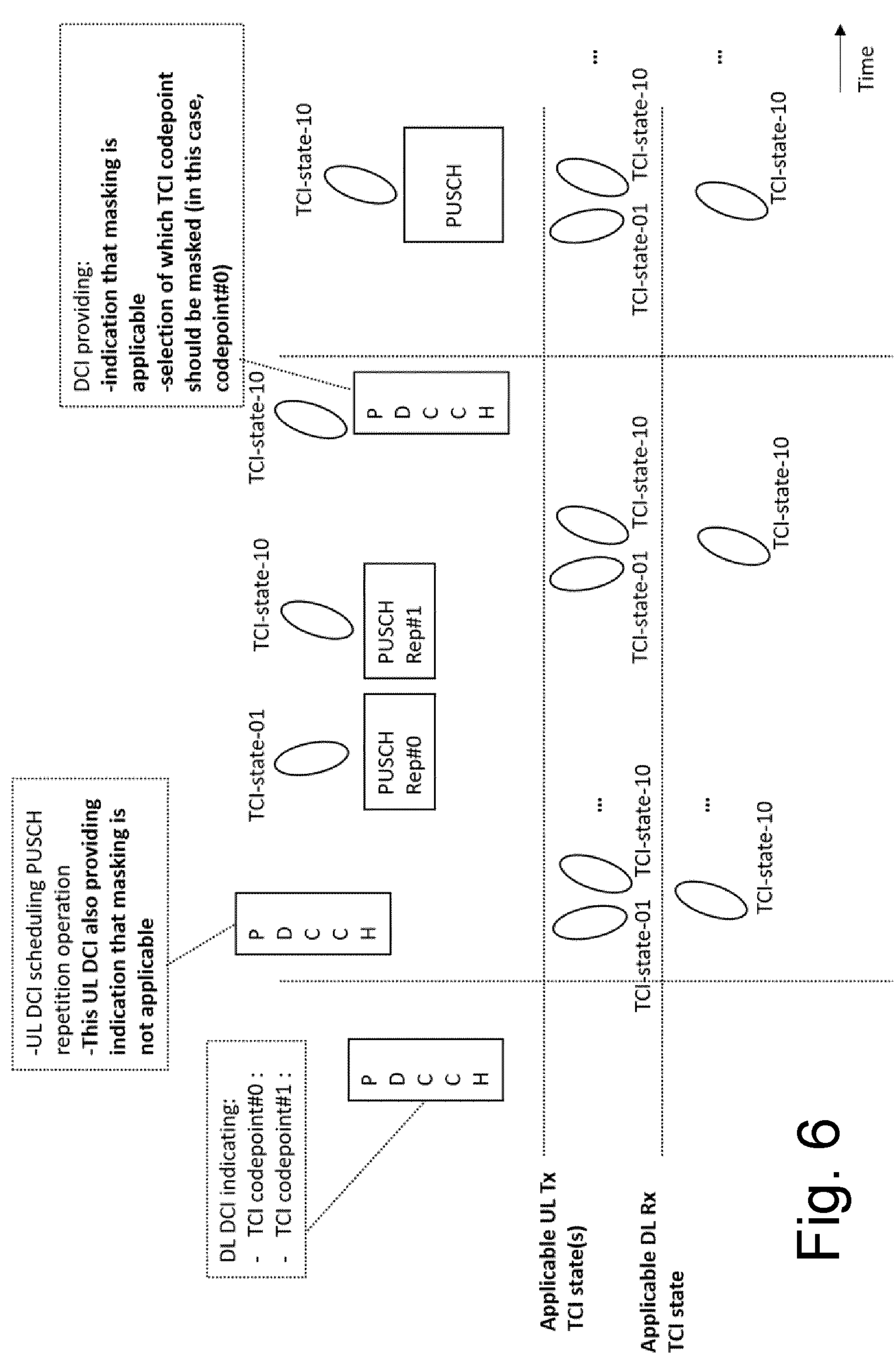
FIGS. 6 to 9 illustrate some examples of some embodiments.

In FIG. 6, an example illustrating an embodiment is shown.

TCI codepoints #0 and #1 are activated, or more precisely the TCI states contained in or associated to these codepoints are activated, via a MAC CE. These codepoints are as follows:

TCI codepoint #0: {joint/common DL/UL TCI state (TCI-state-00), UL TCI state (TCI-state-01)}.

TCI codepoint #1: {joint/common DL/UL TCI state (TCI-state-10), UL TCI state (TCI-state-11)}.

In this example, parts of TCI codepoints #0 and #1 are masked (indicated by underlining in the following) as follows TCI codepoint #0: {joint/common DL/UL TCI state (TCI-state-00), UL TCI state (TCI-state-01)}.

TCI codepoint #1: {joint/common DL/UL TCI state (TCI-state-10), UL TCI state (TCI-state-11)}

The UE is then indicated TCI codepoint #0 and TCI codepoint #1. This is done via a DL DCI on the PDCCH. In the following, it is assumed the corresponding unmasked TCI states are already applicable.

The UE receives an UL DCI scheduling a PUSCH repetition operation consisting of two PUSCH repetitions. This UL DCI indicates (e.g. using 1-bit) that masking is not applicable.

The UE then uses TCI-state-01 for the first PUSCH repetition Rep #0 and TCI-state-for the second PUSCH repetition Rep #1.

The UE then receives a DL DCI via the PDCCH scheduling a (PDSCH and) PUCCH. In some embodiments the PUCCH may correspond to the PDCCH or the PUCCH may be a configured PUCCH (i.e. not corresponding to a PDCCH).

This DCI indicates that masking is applicable, and it also indicates (e.g. using 1-bit) that, in this case, TCI codepoint #0 is masked.

The UE then knows that TCI-state-10 (contained in TCI codepoint #1) should be used for the PUCCH transmission.

Figure 7:
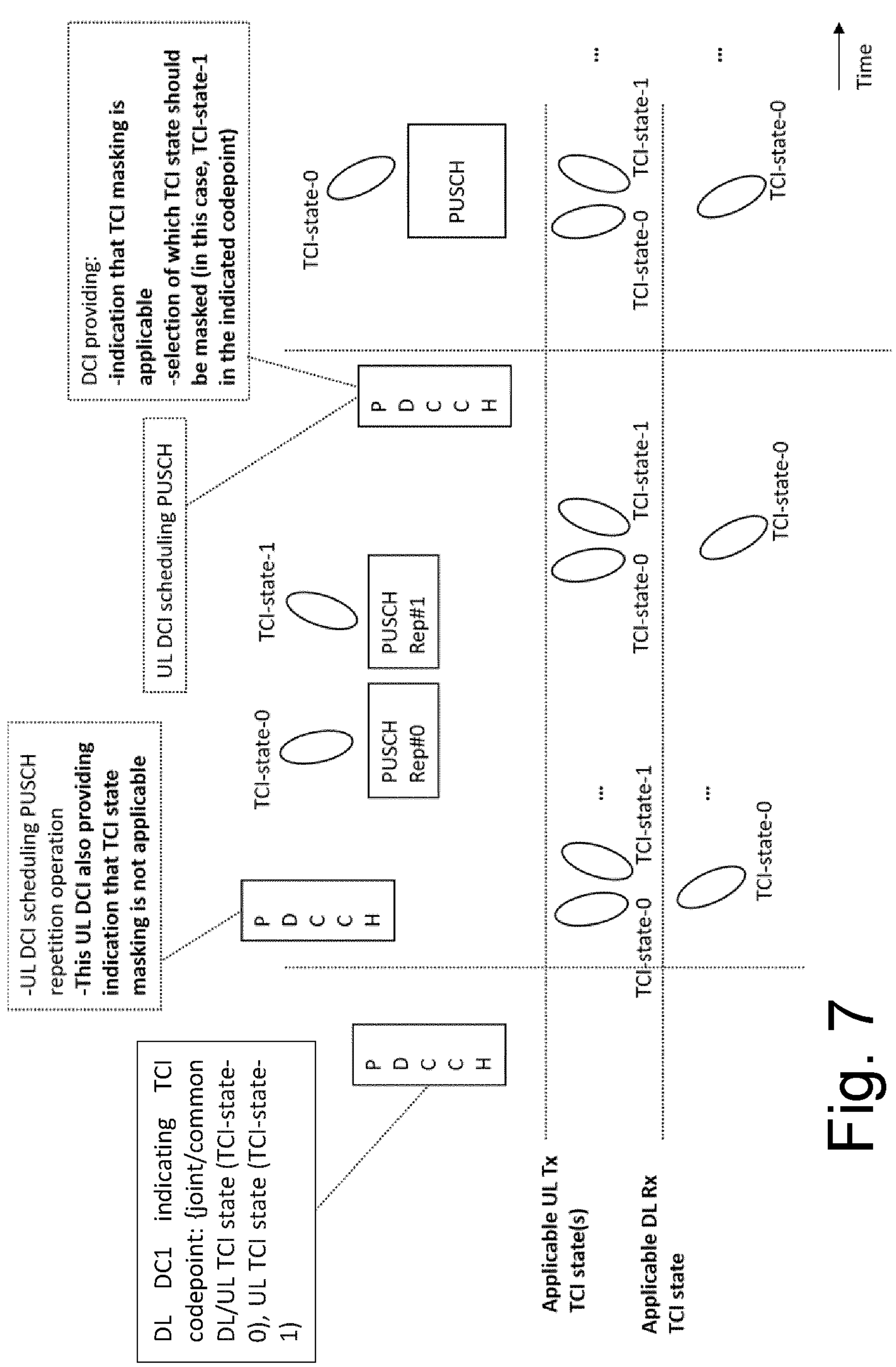

Reference is made to FIG. 7 which shows another example. In this example, the UE is indicated, using one TCI codepoint in the DL DCI, two TCI states where one is a joint/common DL/UL TCI state (termed TCI-state-0) and the second one is an UL TCI state (termed TCI-state-1). In the following, it is assumed that these TCI states are already applicable.

The UE receives an UL DCI scheduling a PUSCH repetition operation consisting of two PUSCH repetitions. This DCI indicates (e.g. using 1-bit) that TCI state masking is not applicable.

The UE then uses both TCI states for the PUSCH repetition operation. The UE uses TCI-state-0 for the first PUSCH repetition Rep #0 and TCI-state-1 for the second PUSCH repetition Rep #1.

The UE then receives a UL DCI scheduling a PUSCH. This DCI indicates that TCI state masking is applicable, and it also indicates (e.g. using 1-bit) that TCI-state-1 is masked.

The UE then knows that TCI-state-0 should be used for the PUSCH transmission.

The UE may be configured to not apply TCI state masking on the DL or on the direction (i.e. DL or UL) with a single TCI state. Thus, in this example, even if the TCI-state-0 is masked, this masking will only be applicable on the UL, i.e. TC-state-0 could be still used in DL.

Figure 8:
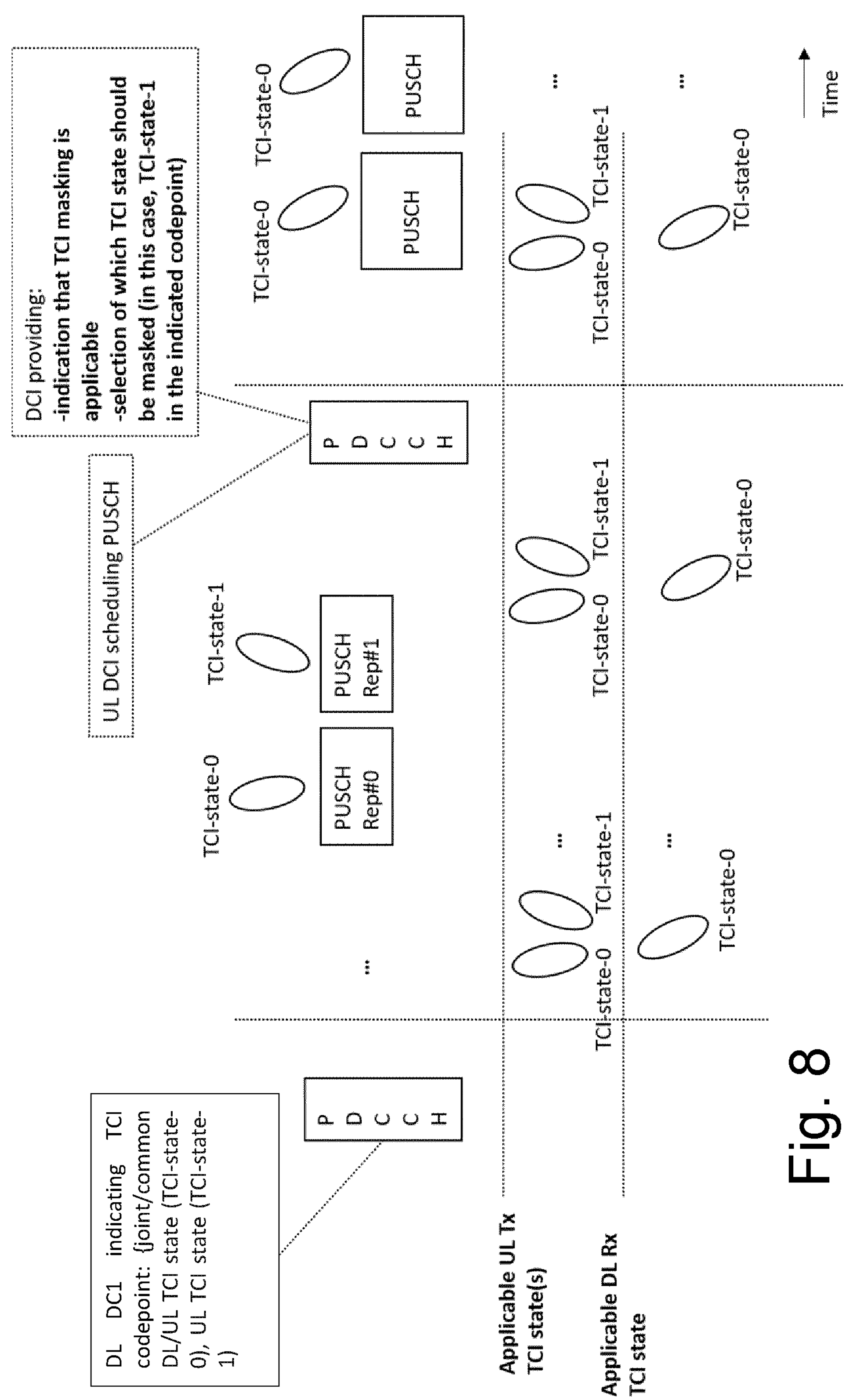

Reference is made to FIG. 8 which shows another example. In this example, the UE is indicated, using one TCI codepoint in the DL DCI, two TCI states where one is a joint/common DL/UL TCI state (termed TCI-state-0) and the second one is an UL TCI state (termed TCI-state-1). In the following, it is assumed that these TCI states are already applicable.

The UE receives an UL DCI (not shown in FIG. 8) scheduling a PUSCH repetition operation consisting of two PUSCH repetitions. This DCI indicates (e.g. using 1-bit) that TCI state masking is not applicable. The UE then uses both TCI states for the PUSCH repetition operation. The UE uses TCI-state-0 for the first PUSCH repetition Rep #0 and TCI-state-1 for the second PUSCH repetition Rep #1.

The UE receives an UL DCI scheduling a PUSCH repetition operation consisting of two repetitions. This DCI indicates that TCI state masking is applicable, and it also indicates that TCI-state-1 is masked. The UE then knows that TCI-state-0 should be used for both PUSCH repetitions.

Figure 9:
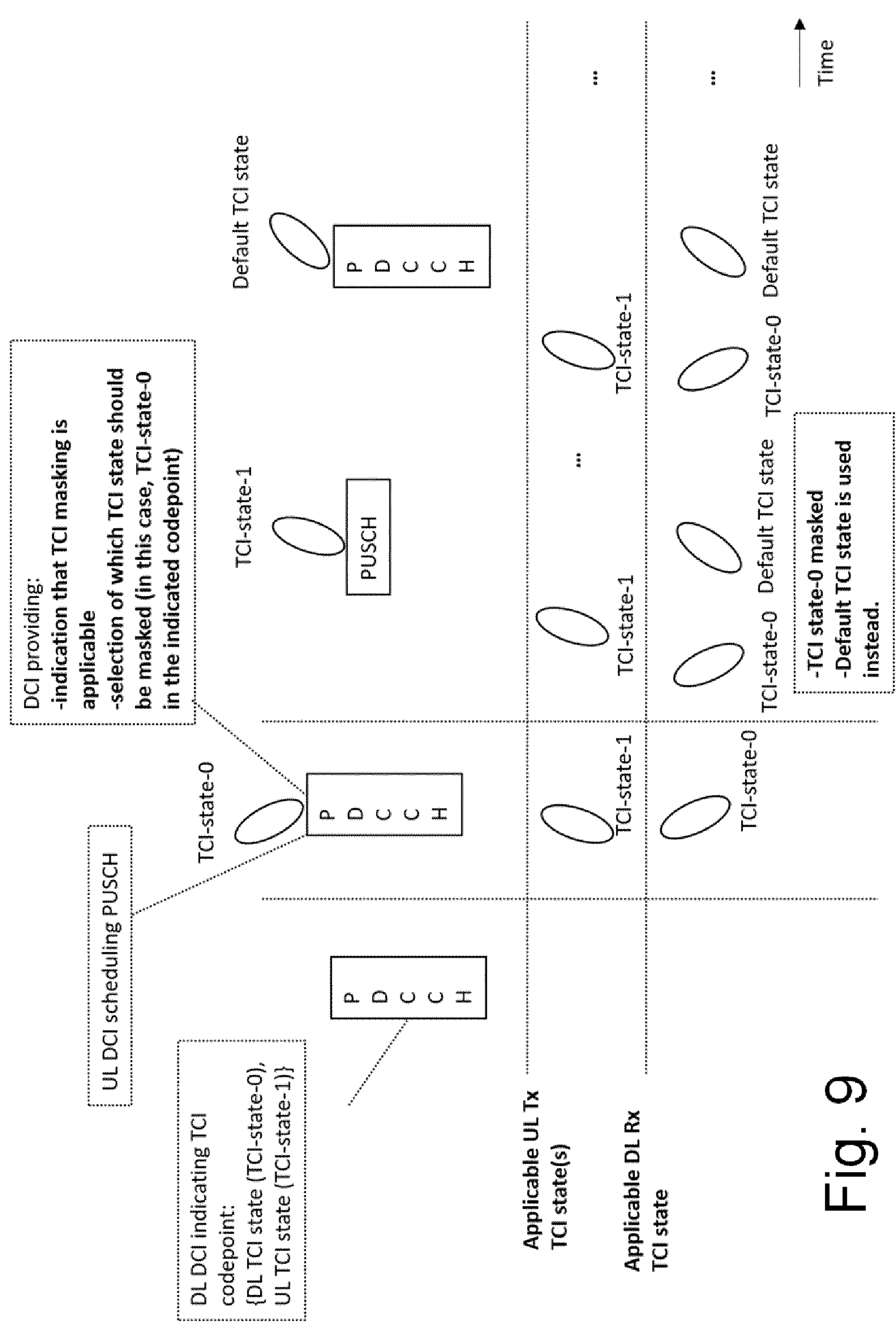

Reference is made to FIG. 9 which shows another example. In this example, the UE is indicated, using one TCI codepoint in the DL DCI, two TCI states where one is a DL TCI state (termed TCI-state-0) and the second one is an UL TCI state (termed TCI-state-1). This is via the PDDCH. In the following, it is assumed that these TCI states are already applicable.

UE receives an UL DCI in a PDCCH scheduling a PUSCH. This DCI indicates (e.g. via 1-bit field) that TCI state masking is applicable, and it also indicates that TCI-state-0 is masked.

The PUSCH is sent using the TCI-state-1.

To receive e.g. a PDCCH, since the DL TCI state is masked, the UE uses a default TCI state. The default (DL) TCI state may be defined to be the (first) TCI codepoint with lowest ID that contains a DL (or joint/common) TCI state or the first (activated) TCI codepoint that contains a DL (or joint/common) TCI state.

Note that, in case of two TCI codepoints indicated via DCI(s), the selection using the second indication may be applied to select which TCI state to mask for each TCI codepoint, i.e. this indication would then apply for both codepoints. In other embodiments, the selection is done between the TCI codepoints. In addition, in case of two TCI codepoints indicated via DCI(s), both the masking/unmasking of a TCI codepoint and/or the TCI state masking per TCI codepoint may be indicated via the DCI(s).

A multi-TCI-state mode in UL may e.g. correspond to any TDM/FDM/SDM (time division multiplexing/frequency division multiplexing/space division multiplexing) scheme with single/multi-panel (at the UE). Such a scheme corresponds to transmitting the same TB (transport block) or UCI (Uplink Control Information) in a single transmission (i.e. divided into two parts/hops, each of which transmitted using an UL TCI state) or multiple repetitions using two UL TCI states; or even multiple transmissions e.g. each of which transmitting different PUSCH layers using two UL TCI states.

It should be also noted that the second indication may indicate that masking is not applicable. In this case, if e.g. the indicated TCI states are both UL TCI states (or. DL TCI states), the second indication may indicate which UL TCI state (or DL TCI state) to apply first in case of a multi-TCI state mode in UL (or DL). Note that for a repetition operation in UL or DL, the UE may be configured or indicated a way for mapping indicated TCI states to (UL/DL) repetitions.

In case of PUSCH, the proposal may apply for dynamically scheduled (via DCI) PUSCH and configured grant PUSCH. The DCI (re-)activating Type 2 configured grant PUSCH may be used to carry at least one of the first indication or second indication.

It should be appreciated that in this document, the following terms may be used interchangeably in certain contexts: (UL) beam, spatial relation information, (separate) UL TCI state, joint or common TCI state, spatial filter, power control information (or power control parameters set), antenna panel or antenna panel ID, QCL-TypeD, and/or the like.

In some embodiments, two TCI states are indicated. Each of these states may point to a single QCL-Type such as QCL-TypeD. In other embodiments, there might be a TCI state pointing to two (or more) QCL-TypeD at a time (and thus a single TCI state may be indicated instead of two).

In the previously described embodiments, reference has been made to the masking/unmasking of TCI state(s). Alternatively or additionally, any other suitable transmission indicator may be masked/unmasked as required. A transmission indicator may define the configuration of one or more channels. This may for example indicate to a UE, the transmission processing configuration of the uplink channels and/or the reception processing configuration of one or more downlink channels.

In some embodiments, QCL type may alternatively or additionally be used. This may be used as an indicator. This indicator may be masked or unmasked in some embodiments.

Four different types of QCL have been defined in the specifications (see TS 38.214):

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

One or more of the previous examples, mainly regarding the defined masking/unmasking operation, may be modified to mask/unmask QCL-Type instead of the TCI state. In some embodiments, two or more QCL-Types may be associated with a TCI state and are individually able to be masked/unmasked.

In some embodiments, any of the QCL-Types can be contained in a TCI state, such as QCL-TypeA, QCL-TypeB, QCL-TypeC, QCL-TypeD. Note that QCL-TypeD or a new QCL-Type may provide a Spatial Tx parameter.

In some embodiments, such as previously described, a first indication and second indication are used. In other embodiments, the two indications may be combined or provided by a single or common indication. The single or common indication may be sent in the same DCI or MAC CE field. For example a 2-bit field may be used, where one bit may indicate whether masking is applicable or not, and the other bit may indicate which TCI state(s) to mask in case masking is applicable.

The TCI state masking when indicated to be applicable may only be applicable after a certain period of time or after a certain physical channel (or certain information/UCI) is transmitted.

In some embodiments, where there are two TCI states which are not masked, a received indication may be used to indicate which TCI state should be applied first.

Reference is made to FIG. 10 which shows a method carried out by an apparatus. The apparatus may be a UE or an apparatus provided in a UE.

As referenced 900, the method comprises receiving an activation command for at least one TCI codepoint.

As referenced 902, the method comprises receiving a DCI indicating one or more TCI codepoints among the activated codepoints (or more precisely among the TCI codepoints associated to active TCI states), which contains at least two TCI states.

As referenced 904, the method comprises receiving a first indication indicating whether TCI state masking is applicable.

As referenced 906, the method comprises determining if TCI state masking is applicable.

If no, the method comprises, as referenced 912, considering the TCI states to be applicable, that is unmasked and usable.

If yes, the method comprises, as referenced 908, receiving a second indication indicating which TCI state(s) of the TCI states in the indicated TCI codepoints is masked.

As referenced 910, the method comprises not using the one or more masked TCI states until an indication is received which unmasks those one or more TCI states.

Figure 11:
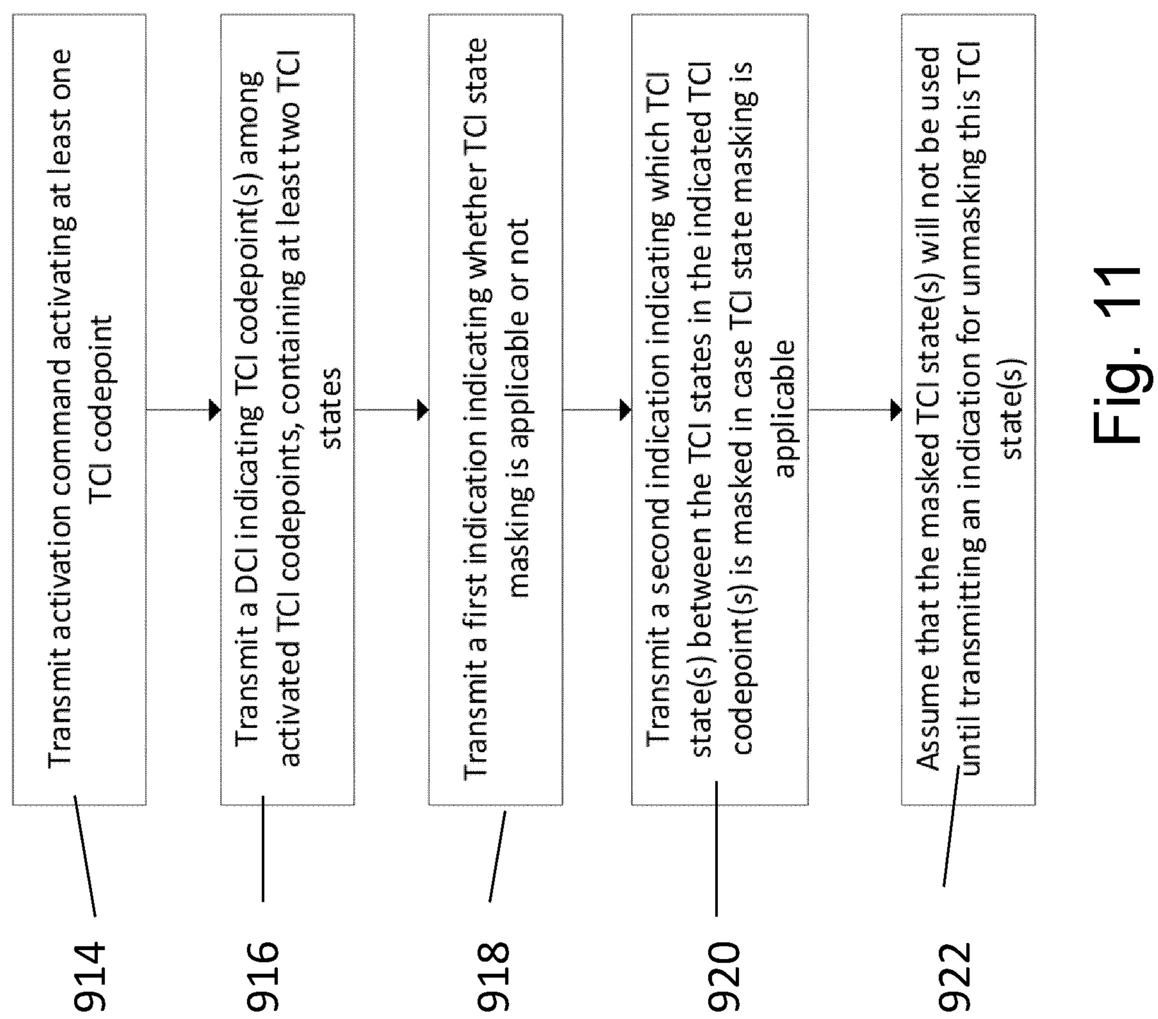
FIG. 11 shows another method of some embodiments.

Reference is made to FIG. 11 which shows a method carried out by an apparatus. The apparatus may be an access point or an apparatus provided in an access point. The access point may be a base station or a gNodeB.

As referenced 914, the method comprises causing an activation command for at least one TCI codepoint, or more precisely for TCI states associated to at least one TCI codepoint, to be transmitted from the access point to the UE.

As referenced 916, the method comprises causing a DCI indicating one or more TCI codepoints among the activated codepoints, which contains at least two TCI states to be transmitted from the access point to the UE.

As referenced 918, the method comprises causing a first indication indicating whether TCI state masking is applicable to be transmitted from the access point to the UE.

As referenced 920, the method comprises causing a second indication indicating which TCI states of the TCI states in the indicated TCI codepoints is masked (in case TCI state masking is applicable), to be transmitted from the access point to the UE.

As referenced 922, the method comprises assuming that the one or more masked TCI states will not be used until an indication is caused to be transmitted from the access point to the UE which unmasks those one or more TCI states.

Some embodiments may have the advantage of a relatively fast UL TCI state selection under a unified TCI framework.

Some embodiments may have the advantage of a relatively fast switching between multi-TCI-state and single-TCI state modes.

Some embodiments may have the advantage of flexibility by allowing to dynamically put on hold a TCI state(s) e.g. in one direction (UL/DL).

Some embodiments may have the advantage of enable TCI state selection when going from multi-TCI-state mode to single-TCI-state mode without increasing the control overhead.

A method of some embodiments will now be described with reference to FIG. 12. The method may be performed by an apparatus. The apparatus may be provided in a communications device or be a communications device. The apparatus may be as shown for example in FIG. 3.

As referenced A1, the method comprises receiving information indicating that one or more of a plurality of indicators is to be changed from one of masked and unmasked to the other of masked and unmasked. The one or more indicators comprise one or more transmission configuration indicators. When an indicator of the plurality of indicators is masked, configuration associated with the respective indicator is not used. When an indicator of the plurality of indicators is unmasked, configuration associated with the respective indicator is usable.

A method of some embodiments will now be described with reference to FIG. 13. The method may be performed by an apparatus. The apparatus may be provided in a base station or other access node or be base station or other access node. The apparatus may be as shown for example in FIG. 3.

As referenced B1, the method comprises causing information to be transmitted indicating that one or more of a plurality of indicators is to be changed from one of masked and unmasked to the other of masked and unmasked. The one or more indicators comprise one or more transmission configuration indicators. When an indicator of the plurality of indicators is masked, configuration associated with the respective indicator is not used. When an indicator of the plurality of indicators is unmasked, configuration associated with the respective indicator is usable.

FIG. 5 shows a schematic representation of non-volatile memory media 400*a* (e.g., computer disc (CD) or digital versatile disc (DVD)) and 400*b* (e.g., universal serial bus (USB) memory stick) storing instructions and/or parameters 402 which when executed by a processor allow the processor to perform one or more of the steps of the methods of FIGS. 10 to 12

Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

Some embodiments may be implemented by circuitry. The term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, an integrated circuit or chiplet.

The embodiments of this disclosure may be implemented by computer software executable by a data processor, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks, and functions. The software may be stored on such physical media as memory chips, or memory blocks implemented within the processor, magnetic media such as hard disk or floppy disks, and optical media such as for example DVD and the data variants thereof, CD or any other suitable physical media. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory, and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples. Embodiments of the disclosure may be practiced in various components such as integrated circuit modules.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus, comprising:

at least one processor; and at least one memory including computer program code;

the at least one memory and the computer program code configured to, with the at least one processor, cause the apparatus at least to:

receive information indicating that one or more of a plurality of indicators is to be changed from one of masked and unmasked to the other of masked and unmasked, wherein:

the one or more indicators comprise one or more transmission configuration indicators;

when an indicator of the plurality of indicators is masked, configuration associated with the respective indicator is not used;

when an indicator of the plurality of indicators is unmasked, configuration associated with the respective indicator is usable; and the masking applies to at least one of: one or more channels, one or more reference signals, one of uplink or downlink, one or more control resource sets, or one or more component carriers.

2. The apparatus as claimed in claim 1, wherein a respective transmission configuration indicator is provided by one or more of a transmission configuration indicator state and quasi co location information.

3. The apparatus as claimed in claim 2, wherein the one or more of transmission configuration indicator states are contained in or associated with one or more transmission configuration indicator codepoints.

4. The apparatus as claimed in claim 2, wherein the apparatus is further caused to receive information indicating activation of one or more of the transmission configuration indicator states contained in or associated with one or more transmission configuration indicator codepoints.

5. The apparatus as claimed in claim 1, wherein the information indicating that one or more of the plurality of indicators is to be changed from one of masked and unmasked to the other of masked and unmasked is provided by one or more of downlink control information, a medium access control control element, radio resource control signalling, or a bitmap.

6. The apparatus as claimed in claim 1, wherein the apparatus is further caused to receive information indicating if masking is applicable to one or more of the indicators.

7. The apparatus as claimed in claim 6, wherein the information indicating if masking is applicable to one or more of the indicators is provided by one or more of downlink control information, a medium access control control element, radio resource control signalling, or a bitmap.

8. The apparatus as claimed in claim 1, wherein when an indicator of the plurality of indicators is masked, the respective indicator is kept masked until the respective indicator is unmasked.

9. The apparatus as claimed in claim 1, wherein the apparatus is further caused to apply masking, when a respective indicator of the plurality of indicators is masked, only on a first transmission instance or on a configured number of transmission instances related to the masking.

10. The apparatus as claimed in claim 1, wherein the apparatus is caused to receive information about the plurality of indicators via downlink control information.

11. The apparatus as claimed in claim 1, wherein the apparatus is further caused to use one or more of the indicators, when unmasked, for a repeated transmission of an uplink channel.

12. The apparatus as claimed in claim 1, wherein the plurality of indicators comprises two uplink indicators, and in one mode one of said uplink indicators is masked and one of said uplink indicators is unmasked.

13. The apparatus as claimed in claim 1, wherein the plurality of indicators comprises two uplink indicators and when unmasked the apparatus is further caused to receive information indicating which of the two uplink indicators is to be applied first.

14. An apparatus, comprising:

at least one processor; and at least one memory including computer program code;

the at least one memory and the computer program code configured to, with the at least one processor, cause the apparatus at least to:

cause information to be transmitted indicating that one or more of a plurality of indicators is to be changed from one of masked and unmasked to the other of masked and unmasked;

wherein:

the one or more indicators comprise one or more transmission configuration indicators;

when an indicator of the plurality of indicators is masked, configuration associated with the respective indicator is not used;

when an indicator of the plurality of indicators is unmasked, configuration associated with the respective indicator is usable; and the masking applies to at least one of: one or more channels, one or more reference signals, one of uplink or downlink, one or more control resource sets, or one or more component carriers.

15. A method, comprising:

receiving information indicating that one or more of a plurality of indicators is to be changed from one of masked and unmasked to the other of masked and unmasked, wherein:

the one or more indicators comprise one or more transmission configuration indicators;

when an indicator of the plurality of indicators is masked, configuration associated with the respective indicator is not used;

when an indicator of the plurality of indicators is unmasked, configuration associated with the respective indicator is usable; and the masking applies to at least one of: one or more channels, one or more reference signals, one of uplink or downlink, one or more control resource sets, or one or more component carriers.

16. The method as claimed in claim 15, wherein a respective transmission configuration indicator is provided by one or more of a transmission configuration indicator state and quasi co location information.

17. The method as claimed in claim 16, wherein the one or more of transmission configuration indicator states are contained in or associated with one or more transmission configuration indicator codepoints.

18. The method as claimed in claim 16, further comprising: receive information indicating activation of one or more of the transmission configuration indicator states contained in or associated with one or more transmission configuration indicator codepoints.

19. The method as claimed in claim 15, wherein the information indicating that one or more of the plurality of indicators is to be changed from one of masked and unmasked to the other of masked and unmasked is provided by one or more of downlink control information, a medium access control control element, radio resource control signalling, or a bitmap.

* * * * *